United States Patent [19]

Clemente, Jr.

[11] Patent Number: 4,901,879

[45] Date of Patent: Feb. 20, 1990

[54] VCR COVER

[76] Inventor: Jerry Clemente, Jr., 714 Second Ave., Troy, N.Y. 12182

[21] Appl. No.: 194,808

[22] Filed: May 17, 1988

[51] Int. Cl.⁴ ............................................. B65D 51/18
[52] U.S. Cl. ..................................... 220/256; 360/137
[58] Field of Search .......................... 220/256; 360/137

[56] References Cited

U.S. PATENT DOCUMENTS

| | | | |
|---|---|---|---|
| 3,128,007 | 4/1964 | Kops | 220/41 |
| 3,388,777 | 6/1968 | Nolan | 190/51 |
| 3,897,885 | 8/1975 | Joyce | 220/345 |
| 3,949,899 | 4/1976 | Jacobs et al. | 220/346 |
| 4,037,053 | 7/1977 | Mueller | 360/137 |
| 4,188,648 | 2/1980 | Guerini | 360/137 |
| 4,221,302 | 9/1980 | Kupersmit | 220/4 |
| 4,230,381 | 10/1980 | Rhoades | 220/345 |
| 4,342,403 | 8/1982 | Badtke et al. | 220/345 |
| 4,502,609 | 3/1985 | Christatos | 220/345 |
| 4,630,160 | 12/1986 | Murayama | 360/137 |
| 4,643,333 | 2/1987 | Martin | 220/345 |
| 4,655,057 | 4/1987 | Derman | 360/137 |

OTHER PUBLICATIONS

"Lock for Magnetic Disk Drive Units", C. W. Meyers, IBM Technical Disclosure Document, vol. 15, No. 9, Feb. 1973.

Primary Examiner—A. Michael Chambers
Attorney, Agent, or Firm—Schmeiser, Morelle & Watts

[57] ABSTRACT

An assembly mounted on a video cassette recorder to bar access of a child to the cassette door includes a stationary bracket, a door cover slidably supported by the bracket to cover and uncover the cassette door and securing means including first and second rigid members carried by the bracket and by the door cover to limit motion of the cover relative to the bracket.

9 Claims, 3 Drawing Sheets 4,901,879

VCR COVER

FIELD OF THE INVENTION

The present invention relates generally to the container closure art and is more particularly concerned with a novel video cassette recorder (VCR) door guard assembly to protect against access by young children.

BACKGROUND OF THE INVENTION

Various means have been devised to protect against childerens' access to medicinal, flamable, corrosive and other deleterious or dangerous contents in containers of all kinds. Still other such protective means have been Provided for electrical contacts and appliances.

None of these, however, is directed to the problem of protecting young children from reaching through a cassette or tape door of a video cassette recorder and none of them would serve that purpose. Further, although that problem has been generally recognized for some time, no answer to it has hitherto been disclosed.

Furthermore, the VCR tape door provides to the child a most interesting receptacle for toys, pencils, candy wrappers and endless other items which result in costly repairs. Also, children are great imitators and will often attempt to load video tapes as they have seen their parents do. Unfortunately this commonly results in tapes being loaded backwards or upside doWn thus damaging the VCR.

SUMMARY OF THE INVENTION

In accordance with this invention of mine a child resistant assembly is provided for a video cassette recorder to enable easy access to the tape door in use and to bar access to the door by a young child at other times. This relative small and light assembly is securely mounted on the shell or housing of a VCR and includes a single stationary part and a single movable part. The movable part is retained in position relative to the stationary part and the VCR shell on which it is mounted by securing means separately carried by each part for mutual engagement when the tape door is not in use. Either of two alternative securing means are provided as shown in the accompanying drawings and described in detail below. One of these is a form of combination lock while the other is designated a "tie lock". In the case of the latter, two hasps carried by the stationary and the movable part are tied or locked together in registry when the tape door is not in use. In the other case, no tying or coupling element is involved but a series of different movements are required to disengage the parts and remove the movable one to open access to the tape door. Personal choice may then decide the selection between these two equally effective child-resistant VCR tape door guards of this invention.

Described broadly and generally, the novel assembly of this invention comprises three basic parts—an elongated channel bracket mountable horizontally on a VCR, a door cover which is receivable interfittingly in longitudinally relatively slidable engagement in the channel bracket to cover and uncover the VCR tape door, and securing means carried by the bracket and by the door cover to limit motion of the door cover relative to the bracket.

Described more in detail, this assembly takes either of two specific forms. In one case the securing means is an interior wall in the bracket channel and a flange on the cover to bear against the interior wall and provide a motion-limiting function and preventing accidental removal of the door guard cover from a position in front of the VCR tape door. In the other version of an assembly of this invention, the securing means are hasp-like members attached to and carried by the bracket and the door cover and positioned for registry when the door cover is in place in front of a VCR tape door. This tie lock embodiment of the invention thus is fastened in place to guard the tape door against the access by a young child by tying the two hasp-like elements together in registry, a conventional lock or equivalent bar or pin arrangement being suitable for the purpose.

BRIEF DESCRIPTION OF THE DRAWINGS

Those skilled in the art will gain a further and better understanding of this invention on consideration of the drawings accompanying and forming a part of this specification, in which.

DETAILED DESCRIPTION OF PREFERRED EMBODIMENTS OF THE INVENTION

Figure 1:
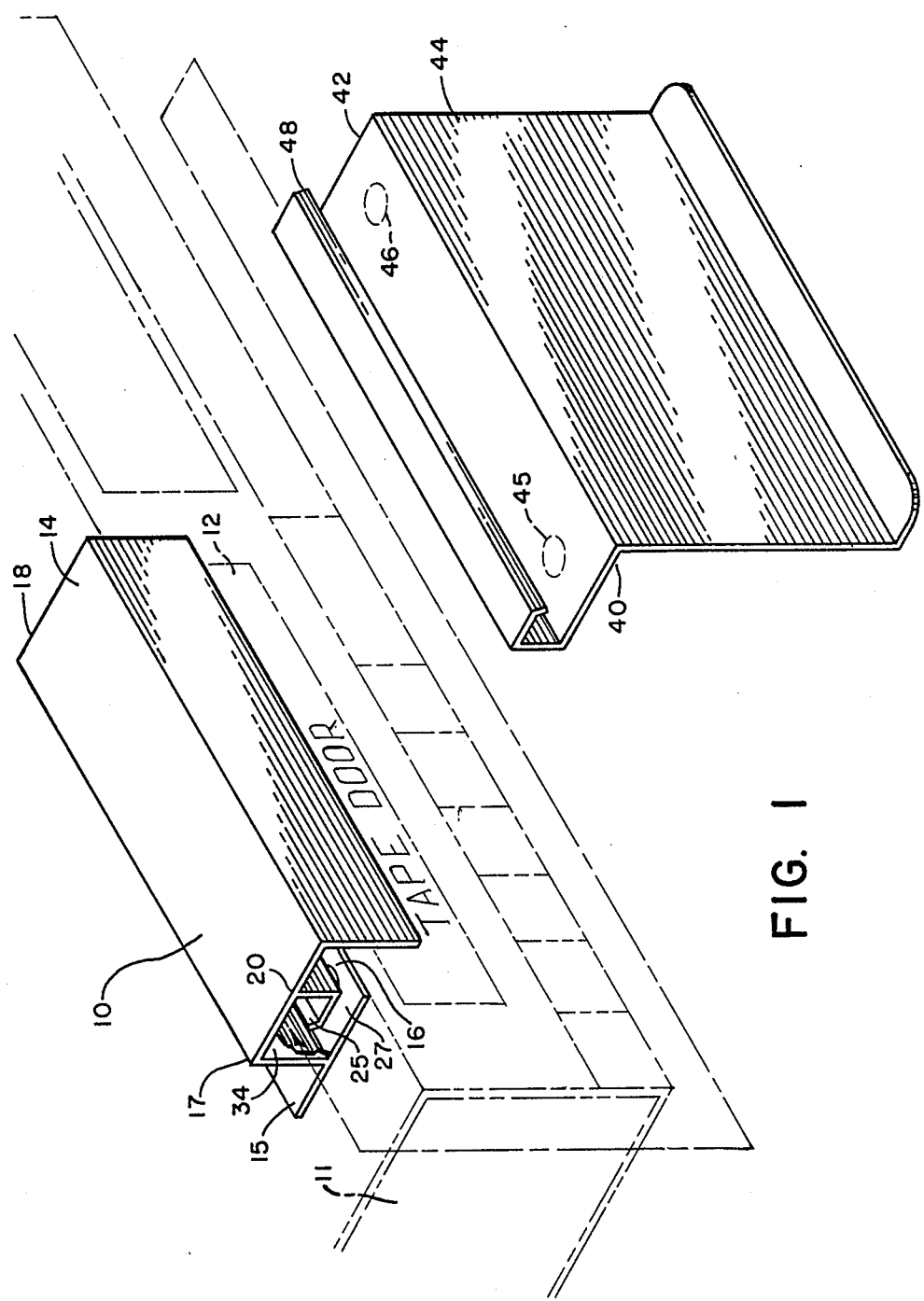
FIG. 1 is an exploded perspective view of a combination lock assembly of this invention mounted on a VCR shown fragmentarily in phantom.

As shown in FIG. 1, combination lock assembly 10 is mounted on VCR 11 above tape door 12, channel bracket 14 of the assembly having a flange 15 fixed to the top of the VCR 11, suitably by epoxy glue so that channel 16 of bracket 14 opens downwardly and bracket ends 17 and 18 are adjacent to the ends of tape door 12. Flange 15 extends from end to end of the bracket and approximately halfway across the open side of channel 16. An inner wall 20 extends from the base of bracket 14 longitudinally dividing channel 16 and having at its longitudinal edge an angularly disposed flange 25 providing in coopration with flange 15 a cover-receiving slot 27. In the portion of flange 15 opposed to flange 25 two apertures 30 (one shown) are provided for detent purposes.

Bracket end walls 34 and 35 partially close channel 25, slot 24 being closed at one end where the channel is half closed by wall 34 and being open at the other end where the channel is closed only to about one quarter of its width by wall 35.

Tape door cover 40 is an elongated article having a body 42 receivable in channel 25 and skirt 44 depending from body 42 to cover tape door 12. Body 42 has two intergrally formed button portions 45 and 46 received in apertures 30 of flange 25 when cover 40 is positioned in channel 16.

Body 42 additionally has flange 48 at one end to bear against flange 25 when skirt 44 is shifted in a direction away from the VCR on which the assembly is mounted. Body 42 is shaped and proportioned so as to be insertable into channel 16 through one end of the bracket between wall 34 and flange 25 of inner wall 20. In assembled relation part of body 42 extends through slot 27 so that skirt 44 hangs below bracket 11 consequently shielding tape door 12 from access by a young child.

To open access to door 12, one must manipulate door cover 40 in a particular manner involving a series of different motions in critical sequence. Specifically, body 42 must be elevated until flange 48 bears against the bottom of channel 25. Then the body must be moved toward the center of channel 16 until it bears against inner wall 20. At that point, body 42 is clear of end wall 34 and not the opposite end wall 35 but can be moved through the open end of channel 16 past end wall 34 to disengage the cover from bracket 10 and remove the skirt 40 from a position in front of the tape door.

In this FIG. 1 embodiment of the invention the securing means identified above and in the claims are, respectively, inner wall 20 including particularly flange 25, and body 42 of cover 40 including particularly flange 48.

Figure 2:
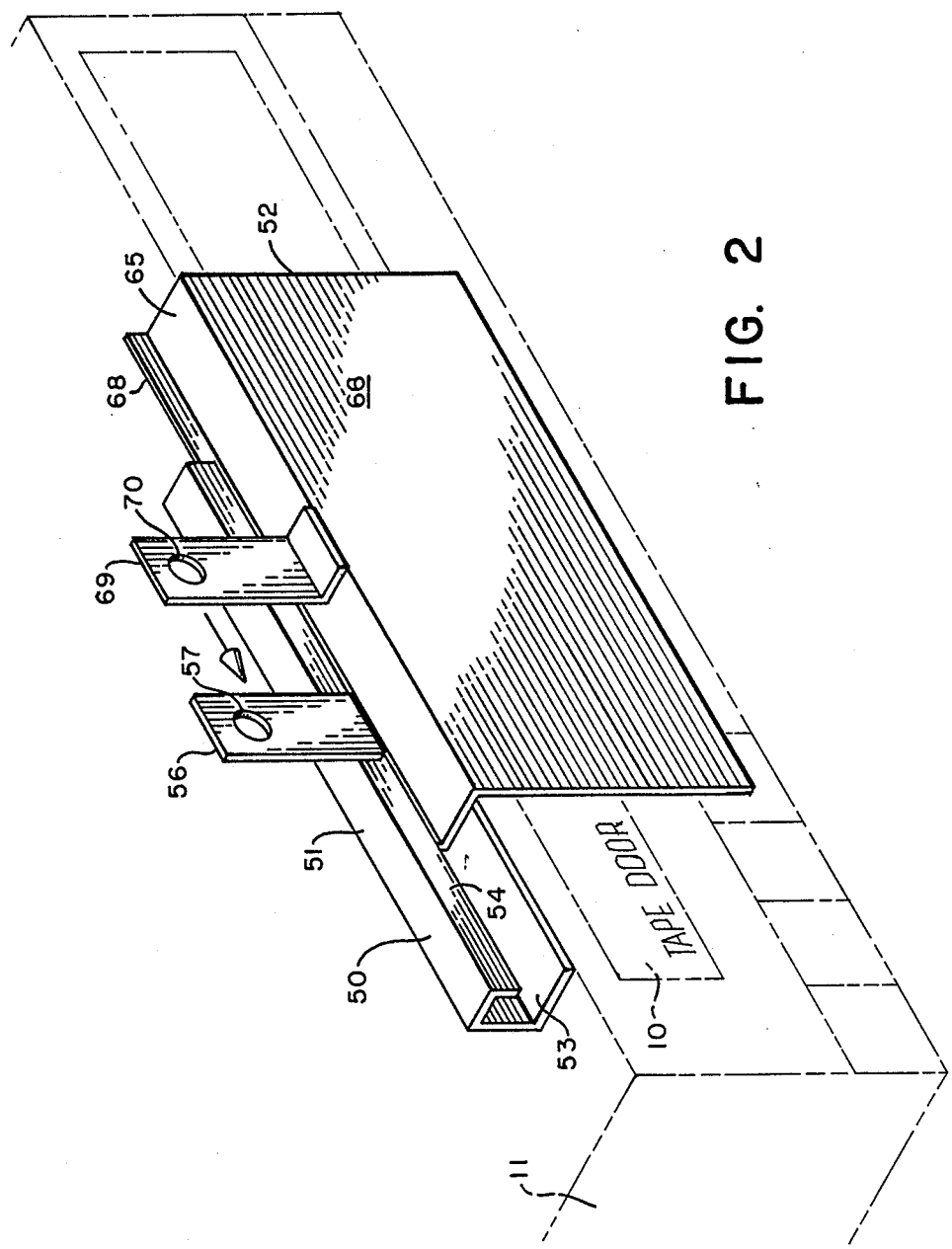
FIG. 2 is an exploded perspective view of a tie lock assembly of this invention mounted on a VCR likewise shown fragmentarily in phantom.
Figure 3:
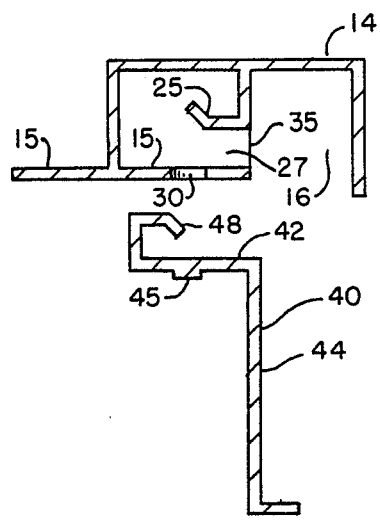
FIG. 3 is a transverse sectional view of each of two major parts shown in FIG. 1, prior to assembly.
Figure 4:
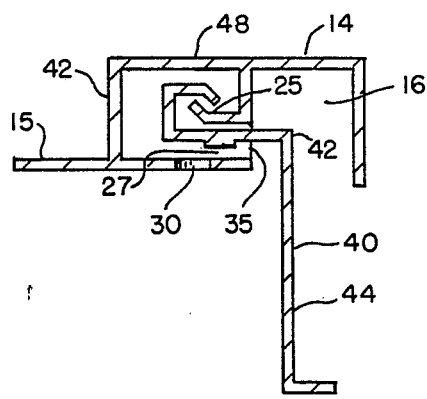
FIG. 4 is a view like that of FIG. 3 showing the two parts as they are being assembled; and, FIG. 5 is another view like that of FIG. 3 showing the parts in assembled relation as indicated in FIG. 1.
Figure 5:
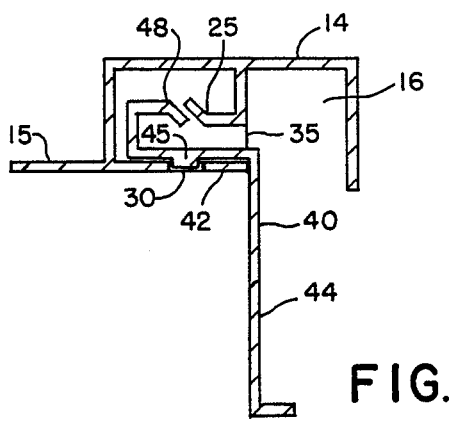

The second preferred embodiment of this invention illustrated in FIG. 2 is likewise mounted on VCR 11 as an assembly 50 comprising an elongated channel bracket 51 and a door cover 52 of corresponding length to that of tape door 12, adapted to be slidably supported in bracket 51 to cover and uncover VCR door 12.

Bracket 50 is secured to the top of VCR 11 directly above door 12 by suitable adhesive such as apoxy glue applied to one side of bracket 50. Channel 53 of the bracket thus opens forwardly and downwardly directed flange 54 formed on the upper side of the bracket 50 as shown in FIG. 2 extends the full length of the bracket. A hasp-like member 56 is attached at about the longitudinal midpoint of flange 54 and extends above bracket 50 so that an aperture 57 near the upper end of the hasp member 56 is clear of bracket 50.

Tape door cover 52, like cover 40, is a unitary article having a body 65 receivable in channel 53 of bracket 50 and skirt 66 to cover door 12. An upstanding flange 68 formed on body 65 is provided to bear against flange 54 to hold the cover in position and guide it in longitudinal sliding motion relative to the bracket 50. A second hasp-like member 69 has an aperture 70 near one end and is secured at its other end to cover 52 near the longitudinal midpoint thereof so that appertures 57 and 70 are in register when skirt 66 is in front of tape door 12.

The FIG. 2 tie lock assembly, unlike the combination lock assembly of FIG. 1, is readily put together and take apart by simply sliding tape door cover into engagement with bracket so that flange 68 is received within channel 53 and is maintained in position with the body 50 extending into the channel as flange 68 bears against flange 54 of the bracket. Since the ends of the bracket are open, cover 52 can be introduced into engagement with the bracket from either end of the bracket. The parts are secured in fixed position with skirt 66 in place in front of tape door 12 and with two hasp members 56 and 69 opposed and their apertures in register. Securing means in this embodiment of the invention thus are as generally described in the general statement of the invention set forth above, taking the form in this case of the two hasp members carried by the bracket and cover being the first and second rigid members of the above definition.

As indicated above, the materials of fabrication and construction of the assemblies of this invention are suitably of light weight but adequate strength and texture to withstand anticipated conditions of use. The component parts may be made of a light metal sheet, or preferably of plastic material, which can be formed by extrusion or a molding technique, as a matter of operator choice. The design in each instance is such that high precision and close clearance are not required.

I claim:

1. A child-resistant video cassette recorder door guard assembly comprising:
    (a) an elongated channel bracket mountable horizontally on a video cassette recorder,
    (b) a video cassette recorder door cover having a body portion and a skirt portion depending therefrom, the body portion being receivable through an end of the bracket channel in interfitting longitudinally relatively slidable engagement for carrying the skirt portion to cover and uncover the video cassette recorder door, and
    (c) securing means including a first rigid member carried by the channel bracket and a second rigid member carried by the cover for engagement with the first rigid member to limit motion of the cover relative to the channel bracket.

2. The assembly of claim 1 in which the securing means first rigid member is an interior wall in the bracket channel and the second rigid member is a flange on the cover body portion to bear against the said interior wall.

3. The assembly of claim 1 in which the first and second rigid members of the securing means are hasps positioned for registry when the skirt portion is in front of the video cassette recorder door.

4. The assembly of claim 2 including end walls partially closing the ends of the bracket channel to limit longitudinal travel of the door cover body portion in the bracket channel and to guide travel of the said body portion through an end of the channel.

5. The assembly of claim 3 including locking means comprising a lock bar engaging the first and second hasps in registry and securing them together against motion of the door cover relative to the channel bracket.

6. A child restraint video cassette recorder door guard assembly comprising:
    co-acting bracket portions including,
    (a) an elongated bracket securely mountable horizontally on the shell of a video cassette recorder;
    (b) an elongated video cassette recorder door cover moveably secured to said elongated bracket and moveable with respect to the video cassette recorder door, said bracket moveable between a cover position wherein said door cover is secured to the elongate bracket, said cover having a skirt portion which hangs below the elongate bracket in front of the cassette door cover and an uncovered position wherein said door cover provides open access to the cassette recorder door; and
    (c) securing means for locking the door cover in the covered position.

7. The invention of claim 6 wherein said elongate bracket is stationary, said door cover is movable and said securing means locks the cover to the bracket such that the cover is in front of the cassette recorder door and the entire video cassette recorder door guard assembly is outside of a video cassette recorder.

8. The invention of claim 7 including locking means comprising a lock bar engaging the bracket and the door cover and securing them together against motion of the door cover relative to the bracket.

9. A securable video recording and playing system comprising:
- a video cassette recorder;
- co-acting bracket portions including a stationary elongate bracket securely mounted horizontally to the shell of the VCR, and
- an elongated video cassette recorder door cover moveably secured to said elongate bracket, said cover moveable between a cover position wherein said door cover is secured to the elongate bracket, and door cover has a skirt which hangs below said elongate bracket in front of the cassette recorder door, said door cover also removable to an uncovered position wherein said door cover provides open access to the cassette recorder door; and
- securing means for locking the door cover in the covered position.

* * * * *